(12) United States Patent
Ishikawa et al.

(10) Patent No.: US 9,864,908 B2
(45) Date of Patent: Jan. 9, 2018

(54) SLOW CHANGE DETECTION SYSTEM

(71) Applicant: YOKOGAWA ELECTRIC CORPORATION, Tokyo (JP)

(72) Inventors: Tetsuya Ishikawa, Tokyo (JP); Nobuo Okabe, Tokyo (JP); Yosuke Ishii, Tokyo (JP); Ken'ichi Kamada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 376 days.

(21) Appl. No.: 14/542,797

(22) Filed: Nov. 17, 2014

(65) Prior Publication Data

US 2015/0139494 A1    May 21, 2015

(30) Foreign Application Priority Data

Nov. 19, 2013  (JP) ................ 2013-238890

(51) Int. Cl.
  *G06K 9/00*  (2006.01)
  *G06K 9/46*  (2006.01)
  (Continued)

(52) U.S. Cl.
  CPC ...... *G06K 9/00624* (2013.01); *G06K 9/00711* (2013.01); *G06K 9/4604* (2013.01);
  (Continued)

(58) Field of Classification Search
  CPC .......... G06K 9/00624; G06K 9/00711; G06K 9/4604; G06T 7/254; G06T 7/248;
  (Continued)

(56) References Cited

U.S. PATENT DOCUMENTS 7,822,273 B1 * 10/2010 Arcaini ................ G06K 9/4642
                                                382/162
2006/0188159 A1 * 8/2006 Shiiyama ............. G06K 9/4647
                                                382/190
(Continued)

FOREIGN PATENT DOCUMENTS

JP       11-326226 A      11/1999
JP     2001-333417 A      11/2001
(Continued)

*Primary Examiner* — Jonathan S Lee
(74) *Attorney, Agent, or Firm* — Sughrue Mion, PLLC

(57) ABSTRACT

A slow change detection system includes: an image acquisition unit adapted to acquire a photographed image including consecutive images of a monitored object; a reference image acquisition unit adapted to acquire a reference image corresponding to the photographed image of the monitored object; a reference image area extraction unit adapted to extract, from the reference image, a reference image area that is an area corresponding to a photographed area of the photographed image; a change detection unit adapted to acquire a change area that is an area of the photographed image which is different from the reference image area and acquire a slow change area by excluding, from the acquired change area, a sudden change area derived from a history of the change area; and a display control unit adapted to superimpose and display information indicating the slow change area on the photographed image.

20 Claims, 13 Drawing Sheets

(51) Int. Cl.
  *G06T 11/60* (2006.01)
  *G06T 7/246* (2017.01)
  *G06T 7/254* (2017.01)
(52) U.S. Cl.
  CPC .............. *G06T 7/248* (2017.01); *G06T 7/254* (2017.01); *G06T 11/60* (2013.01); *G06T 2207/10016* (2013.01); *G06T 2207/20021* (2013.01); *G06T 2207/30232* (2013.01)
(58) Field of Classification Search
  CPC ........... G06T 11/60; G06T 2207/10016; G06T 2207/20021; G06T 2207/30232
  See application file for complete search history.

(56) References Cited

U.S. PATENT DOCUMENTS

| | | | |
|---|---|---|---|
| 2008/0013791 A1* | 1/2008 | Kikuchi | G08G 1/04 382/107 |
| 2011/0116606 A1* | 5/2011 | Yankelevitz | A61B 5/1075 378/207 |
| 2011/0229030 A1 | 9/2011 | Ogura | |
| 2012/0155764 A1 | 6/2012 | Ogura | |
| 2015/0117752 A1* | 4/2015 | Ueno | G06T 11/00 382/141 |
| 2015/0310297 A1* | 10/2015 | Li | G06K 9/00785 382/199 |
| 2015/0363926 A1* | 12/2015 | Enomoto | A61B 6/4233 382/132 |
| 2016/0324500 A1* | 11/2016 | Fan | G01R 33/5676 |

FOREIGN PATENT DOCUMENTS

| | | |
|---|---|---|
| JP | 2005-005782 A | 1/2005 |
| JP | 2008-292263 A | 12/2008 |

* cited by examiner

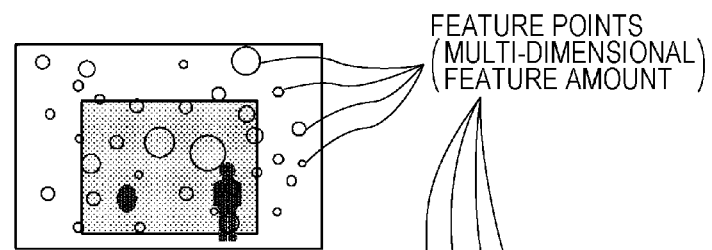
FIG. 6A
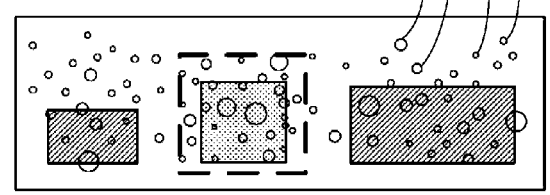
FIG. 6B
FIG. 6C
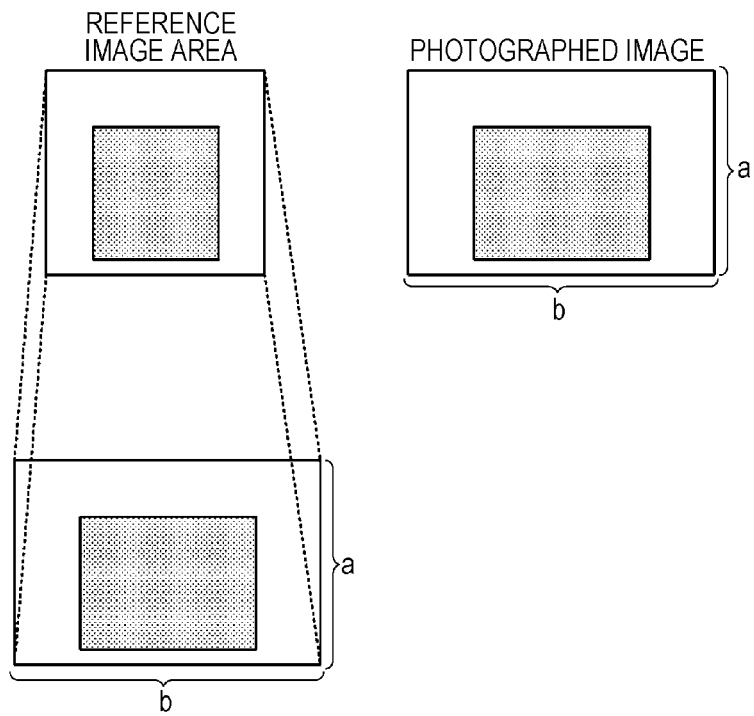
FIG. 6D

PHOTOGRAPHED IMAGE CELL    REFERENCE IMAGE AREA CELL

DIFFERENCE
CELL AREA

A SLOW CHANGE
CELL AREA

SLOW CHANGE DETECTION SYSTEM

CROSS-REFERENCE TO RELATED APPLICATION

This application claims priority from Japanese Patent Application No. 2013-238890 filed with the Japan Patent Office on Nov. 19, 2013, the entire content of which is hereby incorporated by reference.

BACKGROUND

1. Technical Field

The present disclosure relates to a slow change detection system adapted to detect a change that develops gently in time (a slow change) of a monitored object.

2. Related Art

Detection of an abnormality in a monitored object by using a surveillance camera has been widely employed. In general, the abnormality in the monitored object can be detected from some change in the image of the monitored object. This change is often detected by visual observation by an observer. On the other hand, automatic detection of a changed portion in the image by means of the image recognition processing with a use of an information processing apparatus has also been implemented.

The changed portion in the image is detected by, for example, comparing a plurality of images that are consecutive in time and extracting the area in which a difference has occurred. Such a detection method is suitable for detecting an intruder and a sudden change of the monitored object such as an abnormal operation and the like.

Japanese Patent Application Laid-open Publication No. 2005-5782 is an example of the reference relating to this technical field.

SUMMARY

A slow change detection system includes: an image acquisition unit adapted to acquire a photographed image including consecutive images of a monitored object; a reference image acquisition unit adapted to acquire a reference image corresponding to the photographed image of the monitored object; a reference image area extraction unit adapted to extract, from the reference image, a reference image area that is an area corresponding to a photographed area of the photographed image; a change detection unit adapted to acquire a change area that is an area of the photographed image which is different from the reference image area and acquire a slow change area by excluding, from the acquired change area, a sudden change area derived from a history of the change area; and a display control unit adapted to superimpose and display information indicating the slow change area on the photographed image.

BRIEF DESCRIPTION OF DRAWINGS

FIG. 6A to FIG. 6D are diagrams illustrating an operation of a reference image area extraction unit;

DETAILED DESCRIPTION

Figure 1:
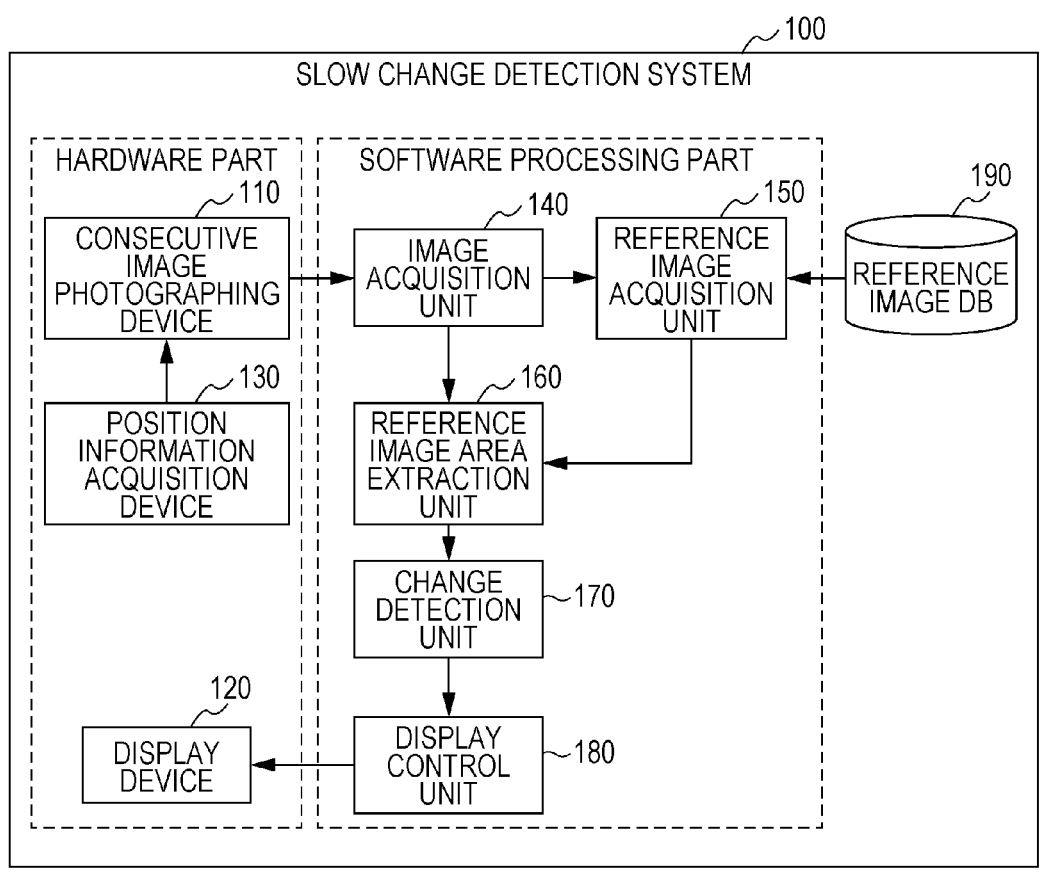
FIG. 1 is a block diagram illustrating a configuration of a slow change detection system according to the present embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

For some monitored object, there is a case where one intends to detect a change that develops gently in time (a slow change) such as rust, frost, stain, and the like rather than a sudden change such as the movement of a human and the like. With respect to such a slow change, it is difficult to detect it by comparing the consecutive images. Furthermore, when the detection of the slow change is intended, it is desirable to exclude the sudden change in the monitored object from the detected object. Therefore, the development of the technique for detecting the slow change only has been desired.

Thus, one of the purposes of the present disclosure is to provide a slow change detection system in which the change developing gently (the slow change) is the object to be detected.

To solve the above-described problems, a slow change detection system according to the present disclosure includes: an image acquisition unit adapted to acquire a photographed image including consecutive images of a monitored object; a reference image acquisition unit adapted to acquire a reference image corresponding to the photographed image of the monitored object; a reference image area extraction unit adapted to extract, from the reference image, a reference image area that is an area corresponding to a photographed area of the photographed image; a change detection unit adapted to acquire a change area that is an area of the photographed image which is different from the reference image area and acquire a slow change area by excluding, from the acquired change area, a sudden change area derived from a history of the change area; and a display control unit adapted to superimpose and display information indicating the slow change area on the photographed image.

Here, the photographed image is associated with information of a photographed position, and the reference image acquisition unit can acquire the reference image corresponding to the photographed image based on the information of the photographed position.

In addition, the change detection unit can divide the photographed image and the reference image area into subareas, and determine whether or not the photographed image is different from the reference image area on a subarea basis and acquire, as the change area, an area of the photographed image including a difference subarea that is a subarea in which a degree of difference is large.

Moreover, the change detection unit can calculate a pixel value difference between pixels positionally corresponding to the photographed image and the reference image area in the subarea and further calculate a similarity evaluation value that becomes a higher value for a smaller accumulated total of absolute values of the pixel value difference, and determine whether or not the subarea is the difference subarea by using the similarity evaluation value.

At this time, the change detection unit can shift the subarea of the photographed image vertically and laterally by a predetermined amount, calculate the similarity evaluation value for a plurality of shifted subareas, and determines whether or not the subarea is the difference subarea by using the highest similarity evaluation value.

In addition, the reference image area extraction unit can shape the extracted reference image area so that the extracted reference image area has a same shape and a same size as the photographed image.

Moreover, the change detection unit can define a difference subarea group surrounded by subareas that are not the difference subareas, as one object; and calculate a change amount of a center of gravity and an area in the object and, when the change amount is greater than or equal to a predetermined reference value, acquire an area including difference subareas forming the object as the sudden change area.

According to the present disclosure, provided is the slow change detection system in which the change developing gently (the slow change) is the object to be detected.

The embodiments of the present disclosure will be described by referring to the drawings. FIG. 1 is a block diagram illustrating a configuration of a slow change detection system 100 according to the present embodiment. In the present embodiment, the slow change detection system 100 will be described for the case of being applied to the slow change detection of a monitored object in a plant. The slow change in the monitored object in the plant may include, for example, rust, frost, and stain. On the other hand, a movement of opening and shutting a valve, an operation made to the monitored object, and the like by a worker (an operator) are excluded from the object to be detected, because these are not the slow change.

As illustrated in FIG. 1, the slow change detection system 100 includes a consecutive image photographing device 110, a display device 120, and a position information acquisition device 130, as a hardware part. Furthermore, the slow change detection system 100 includes an image acquisition unit 140, a reference image acquisition unit 150, a reference image area extraction unit 160, a change detection unit 170, and a display control unit 180, as a software processing part. Further, the slow change detection system 100 includes a reference image database (DB) 190.

The slow change detection system 100 can be formed of one mobile information processing device, for example, a tablet PC. It is noted that the slow change detection system 100 may be formed of a plurality of information processing devices. For example, the hardware part of the slow change detection system 100 may be formed of a mobile information processing device such as a tablet PC. Furthermore, the software part and the reference image DB 190 of the slow change detection system 100 may be formed of another information processing device. In this case, the hardware part and the software part are configured to be able to perform radio communications or wired communications to each other.

The consecutive image photographing device 110 is a camera adapted to photograph consecutive images (a motion image) of the monitored object. Any bit rate, resolution, format, and the like of the image can be set. For the display device 120, a general display device such as a liquid crystal display device and the like can be used.

The position information acquisition device 130 is a device adapted to measure the current position and, for example, is able to utilize the GPS. The position information acquisition device 130 may utilize a signal and the like from a base station or an access point to acquire the position information. The position information acquired by the position information acquisition device 130 is associated with the image photographed by the consecutive image photographing device 110. This allows for identifying the place where the image has been photographed.

For these hardware parts, the functions that are generally provided to the mobile information processing device such as the tablet PC and the like can be utilized as they stand, for example.

The reference image DB 190 is a database adapted to store the reference images of the monitored object. The reference images are images that have been obtained by photographing in advance the monitored object under a reference state. The reference state refers to a normal state that has substantially no rust, frost, stain, nor the like, for example. Further, the reference images are images that do not include the photographed object which changes in a short term (suddenly) such as a worker and the like, for example.

Figure 2:
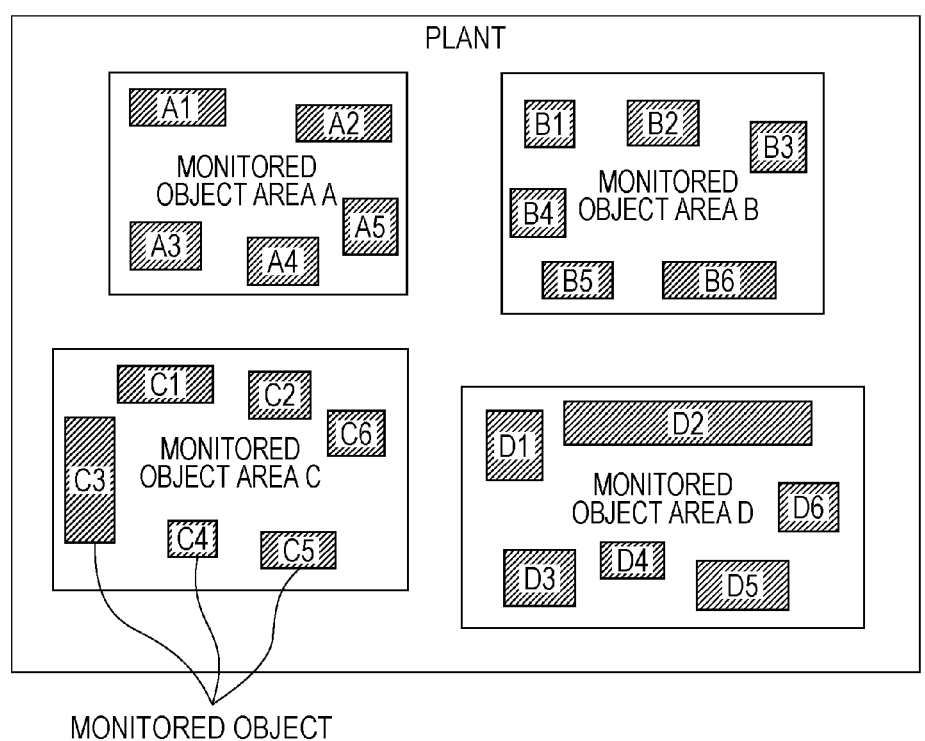
FIG. 2 is a diagram illustrating a monitored object in the present embodiment.

Here, the monitored object in the plant of the present embodiment will be described by referring to FIG. 2. In the example illustrated in this figure, the plant is divided into a plurality of monitored object areas (a monitored object area A to a monitored object area D). Furthermore, a plurality of monitored objects exists in respective monitored object areas. For example, in the monitored object area A, A1 to A5 exist as the monitored objects and, in the monitored object area C, C1 to C6 exist as the monitored objects.

Figure 3A:
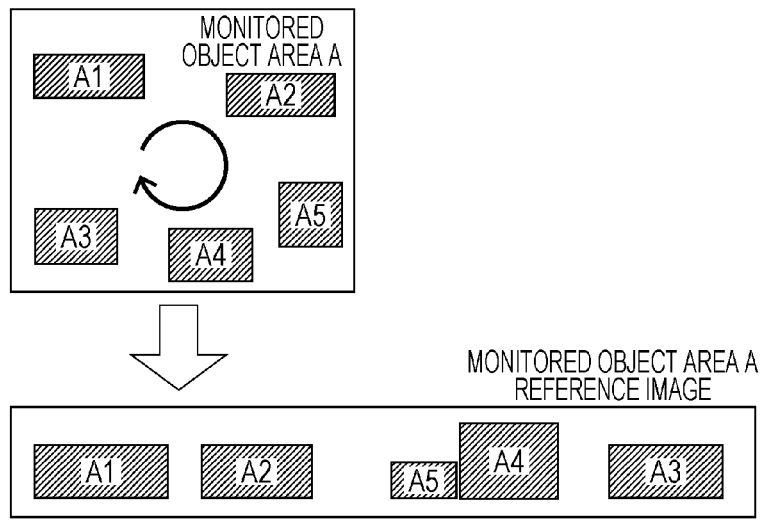
FIG. 3A and FIG. 3B are diagrams illustrating an example of reference images.
Figure 3B:
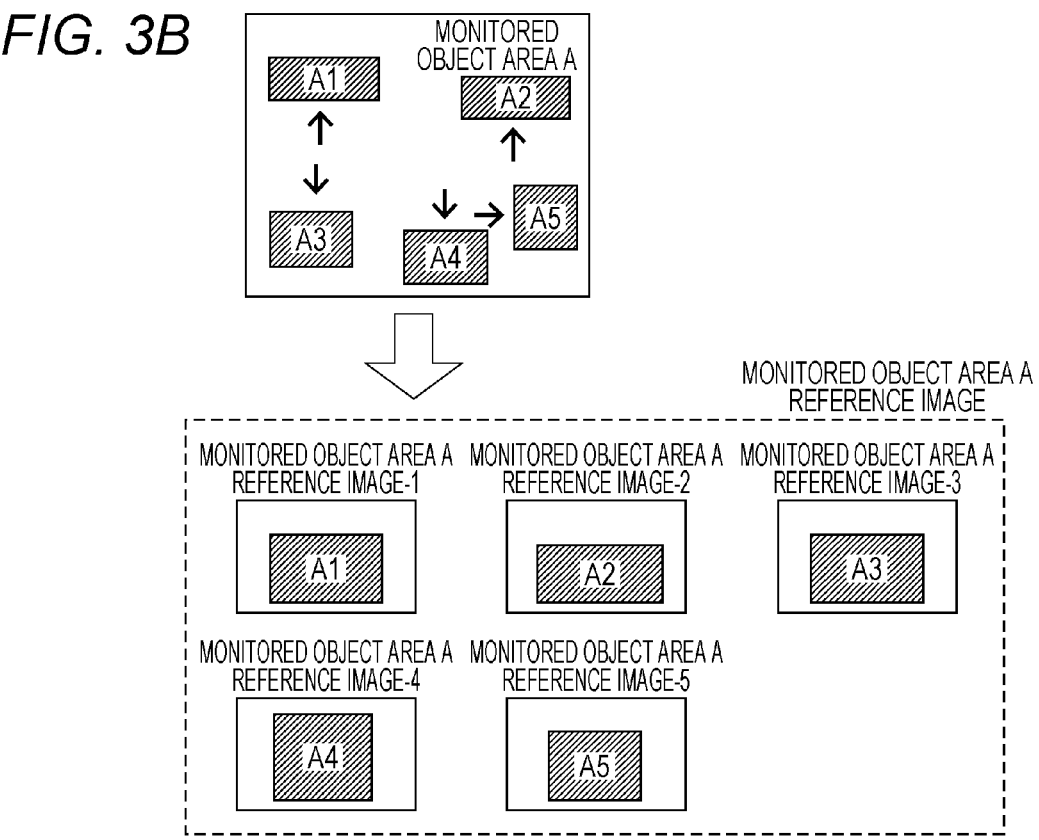

The reference images are the photographed images of these monitored objects and grouped into each monitored object area. It is sufficient that the reference images are the images including all the monitored objects. For example, the reference image may be one image in which all the monitored objects within one monitored object area are included, as illustrated in FIG. 3A. Alternatively, the reference image may be divided into a plurality of images in each of which an individual monitored object within one monitored object area is included, as illustrated in FIG. 3B, for example. Further, the same monitored object may be included in a plurality of reference images.

Further, position information is added to the reference images grouped into each monitored object area. For example, the position information of the monitored object area A is added to the reference image of the monitored object area A. The position information of the monitored object area B is added to the reference image of the monitored object area B. The position information may be recorded in a tag and the like of the reference image. The position information may be included in management data that associates the position information with the reference image or the monitored object area.

Turning back to the description of FIG. 1, the image acquisition unit 140 acquires the photographed images from the consecutive image photographing device 110 adapted to photograph the consecutive images. The photographed images acquired by the image acquisition unit 140 may be all the frames of the consecutive images or a part of the frames extracted from the consecutive images. It is noted that the extraction frequency is of a certain degree at which the same object is photographed in a plurality of frames.

The reference image acquisition unit 150 acquires, from the reference image DB 190, the reference images corresponding to the photographed images acquired by the image acquisition unit 140. As described above, the position information of the photographed place has been associated with the photographed image. Furthermore, the position information of the corresponding monitored object area is associated with the reference image grouped into each monitored object area. Therefore, by collating these pieces of position information with each other, the reference image acquisition unit 150 is able to acquire the reference image corresponding to the photographed image from the reference image DB 190.

When the entire monitored objects within the monitored object area are included in one photographed image as illustrated in FIG. 3A, the reference image acquisition unit 150 acquires one reference image corresponding to the photographed image as the reference image. On the other hand, when the monitored objects within the monitored object area are divided into a plurality of photographed images as illustrated in FIG. 3B, the reference image acquisition unit 150 acquires a plurality of reference images corresponding to these photographed images as the reference images.

The reference image area extraction unit 160 extracts, from the reference image acquired by the reference image acquisition unit 150, the area (the reference image area) corresponding to the photographed area (or the photographed object) of the photographed image. Hereafter, the image extracted by the reference image area extraction unit 160 is referred to also as the reference image area.

Various methods can be used for the extraction of the reference image area corresponding to the photographed image from the reference image. For example, it is possible to use the SIFT and the SURF algorithms that are the method in which the correspondence between the photographed image and the reference image is evaluated by setting feature points expressed by multiple dimensions of the feature amount and the HOG algorithm that uses a statistics learning scheme. For example, the reference image area extraction unit 160 shapes the reference image area extracted from the reference image to make it correspond to the photographed image.

The change detection unit 170 acquires a change area that is an area which is different from the reference image area in the photographed image. That is, the change detection unit 170 divides the photographed image and the reference image area both into multiple cells (subareas) to compare them on a cell basis (detect the degree of difference on a cell basis). The change detection unit 170 detects cells (difference cells) in which the degree of difference is large. The change detection unit 170 then acquires the area made up of the difference cells in the photographed image as the change area. The change detection unit 170 acquires (or detects) a slow change area by using the history of the change area of the photographed image (the difference cell area) to identify the area which has suddenly changed and by excluding this area from the change area.

The display control unit 180 superimposes the slow change area acquired by the change detection unit 170 on the consecutive images photographed by the consecutive image photographing device 110 to display them on the display device 120. This allows the worker to visually recognize the area where the slow change has been detected. This display may be provided in real-time or may not be provided in real-time. For example, the display control unit 180 may acquire the consecutive images photographed by the consecutive image photographing device 110 later in a collective manner and apply the detection process and the displaying process of the detected result to these consecutive images.

Next, the operation of the slow change detection system 100 will be described by referring to the flowcharts of FIG. 4 and FIG. 5. In the following example of the operation, the reference images grouped into each monitored object area have already been stored in the reference image DB 190.

In the operation, the worker photographs the consecutive images of the monitored object by utilizing the consecutive image photographing device 110 of the slow change detection system 100 while changing the monitored object area.

Figure 4:
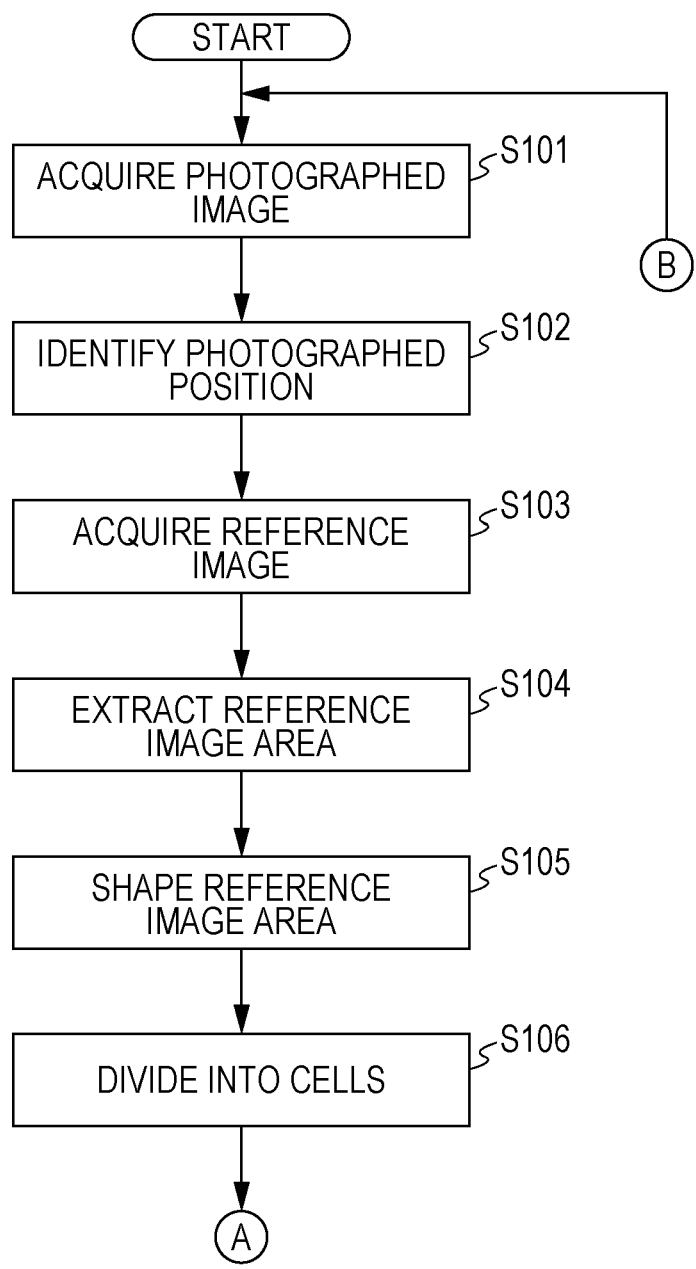
FIG. 4 is a flowchart illustrating an operation of the slow change detection system.
Figure 5:
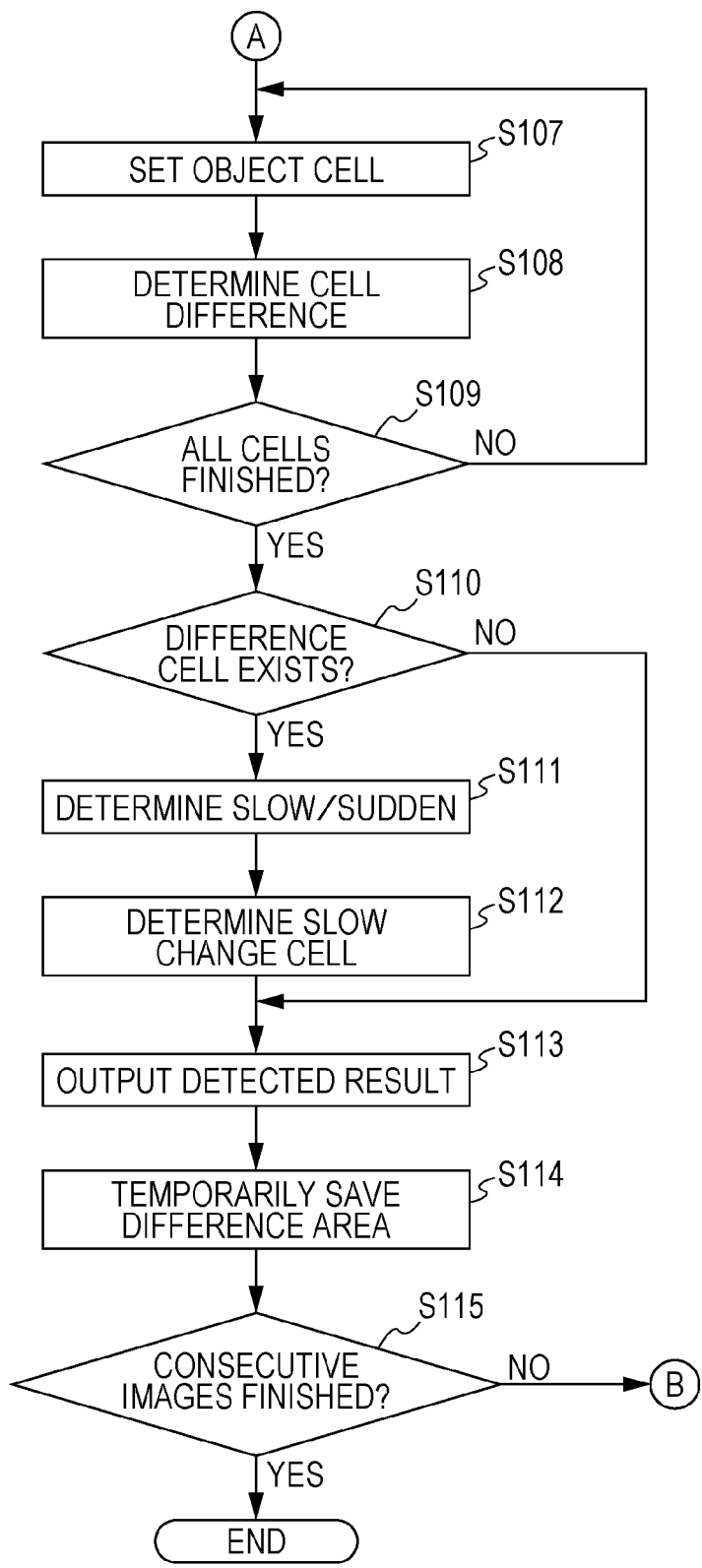
FIG. 5 is a flowchart illustrating the operation of the slow change detection system.

Upon the start of the operation, the image acquisition unit 140 acquires the photographed image from the consecutive image photographing device 110 (FIG. 4: S101). Then, the reference image acquisition unit 150 identifies the photographed position based on the position information added to the acquired photographed image (S102). The identification of the photographed position allows the reference image acquisition unit 150 to identify which of the photographed images in the monitored object area this photographed image is. The reference image acquisition unit 150 acquires, from the reference image DB 190, the grouped reference images corresponding to the identified monitored object area (S103).

Next, the reference image area extraction unit 160 extracts, from the reference image, the area (the reference image area) which corresponds to the photographed area (or the photographed object) of the photographed image (S104). This extraction is implemented by the scheme that uses the feature points expressed by multiple dimensions of the feature amount. For example, FIG. 6A illustrates the feature points set by a predetermined algorithm in the photographed image. In the example illustrated in this figure, the feature points are simplified into one dimension and each represented by the size of the circle for easier understanding.

FIG. 6B illustrates the feature points set to the reference image by using the same algorithm. The reference image area extraction unit 160 uses the mutual positional relationship among the feature points to collate the reference image with the photographed image. Thereby, the reference image area extraction unit 160 extracts, from the reference image, the area (the reference image area) which corresponds to the photographed image, as illustrated in the rectangular area represented by the dashed lines in FIG. 6B.

The reference image area extraction unit 160 shapes the extracted reference image area so that, for example, it has the same shape and the same size as the photographed image (S105). For example, when the extracted reference image area has the shape as depicted in FIG. 6C, the reference image area extraction unit 160 shapes this reference image area so that it has the same shape and the same size as the photographed image, as illustrated in FIG. 6D.

Figure 7A:
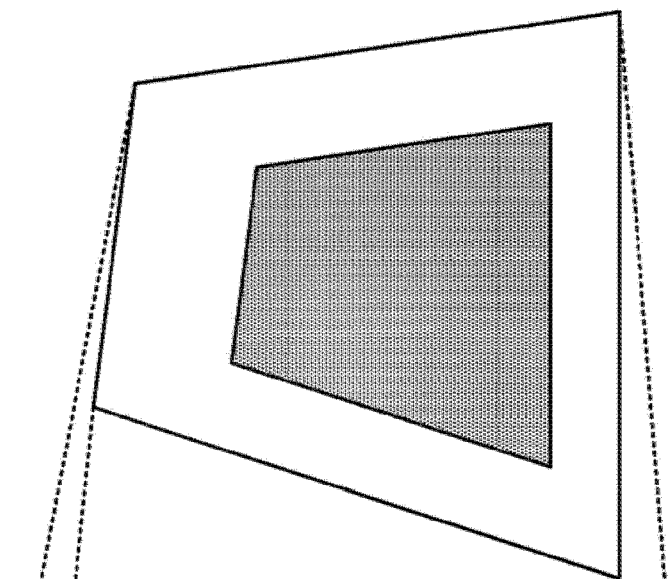
FIG. 7A and FIG. 7B are diagrams illustrating shaping of an extracted reference image area.
Figure 7B:
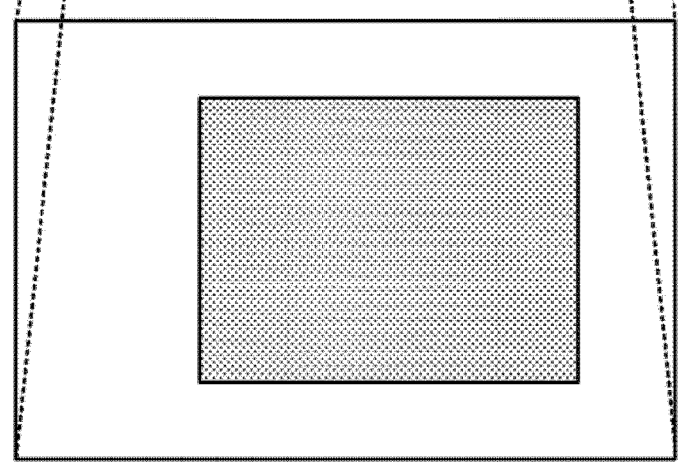

At this time, there is a case where a distorted shape as depicted in FIG. 7A is extracted due to the photographing angle and so on. Also in this case, the reference image area extraction unit 160 shapes the reference image area so that it has the same shape and the same size as the photographed image, as illustrated in FIG. 7B.

Next, the change detection unit 170 divides both of the photographed image and the shaped reference image area into multiple cells (S106). The cell may have any size. Each of the cells may be a square whose side has a length of around ten pixels, for example. The change detection unit 170 divides the photographed image and the reference image area in a similar manner by using the cell having substantially the same size and the same shape, for example.

Figure 8A:
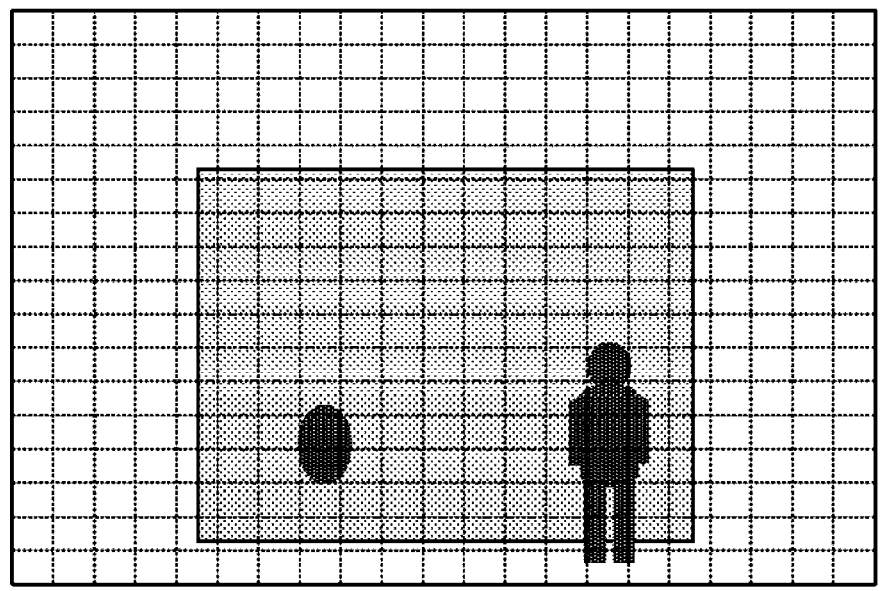
FIG. 8A is a diagram illustrating an example of a photographed image divided into multiple cells.
Figure 8B:
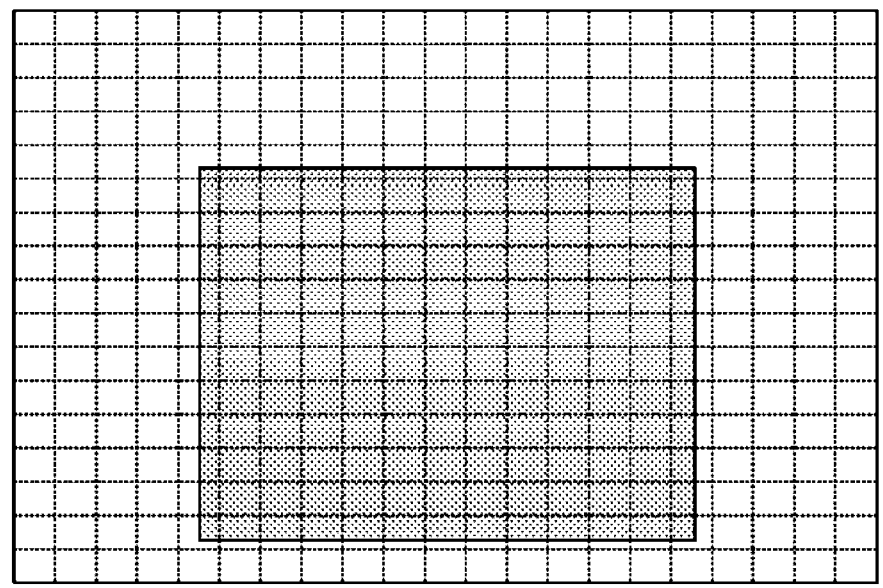
FIG. 8B is a diagram illustrating an example of the reference image area divided into multiple cells.

FIG. 8A illustrates an example of the photographed image divided into multiple cells. FIG. 8B illustrates an example of the reference image area divided into multiple cells. The reference image area is shaped so as to have the same shape and the same size as the photographed image. Thus, each of the cells of the photographed image corresponds to each of the cells of the reference image area.

After dividing both of the photographed image and the reference image area into multiple cells, the change detection unit 170 sets a process object cell (S107: FIG. 5). The process object cell can be set from the cells in a predetermined order.

Then, the change detection unit 170 determines for the process object cell whether or not the photographed image is different from the reference image area (that is, whether or not the process object cell is the cell (the difference cell) in which the degree of difference between the photographed image and the reference image area is large) (S108). The fact that the photographed image is different from the reference image area indicates that the photographed image has changed from the state of the reference image. The change detection unit 170, for example, calculates the pixel value difference between the pixels of the process object cell that correspond to each other in the position and, further, calculates a similarity evaluation value that becomes a higher value for a smaller accumulated total of the absolute values of the pixel value difference. The change detection unit 170 is able to determine whether or not the process object cell is the difference cell by using this similarity evaluation value.

Figure 9:
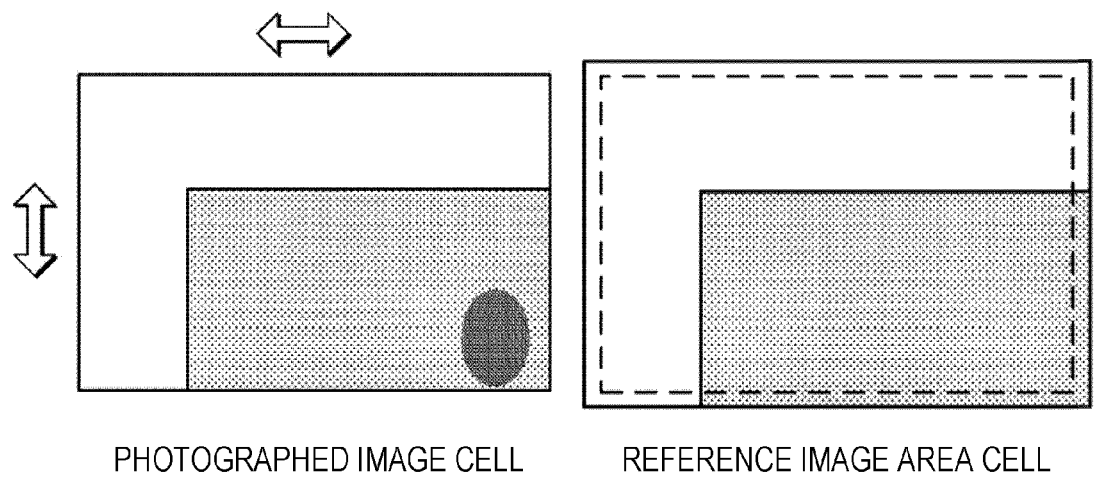
FIG. 9 is a diagram illustrating a similarity evaluation of the cells.

At this time, the change detection unit 170 may take into consideration of the shift between the photographed image and the reference image area. That is, the change detection unit 170 sets the margin to the cell in the reference image area (the reference image area cell) as illustrated in FIG. 9, for example. Furthermore, for example, the change detection unit 170 shifts the process object cell of the photographed image (the photographed image cell) in vertically and laterally by a predetermined amount (for example, a few dots) and calculates the similarity evaluation value with respect to a plurality of shifted process object cells. Then, for example, the change detection unit 170 may employ the largest similarity evaluation value to determine whether or not the process object cell is the difference cell.

Then, when the similarity evaluation value in the process object cell is greater than or equal to a reference value, the change detection unit 170 determines that the photographed image is similar to, namely, is not different from the reference image area in this process object cell, and determines that this process object cell is the similarity cell. On the other hand, when the similarity evaluation value in the process object cell is less than the reference value, the change detection unit 170 determines that the photographed image is not similar to, namely, is different from the reference image area in this process object cell, and determines that this process object cell is the difference cell.

Figure 10A:
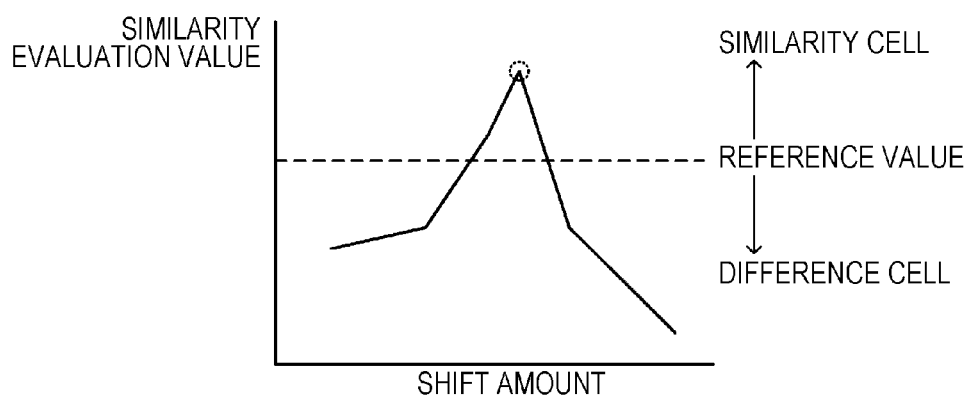
FIG. 10A and FIG. 10B are diagrams illustrating the similarity evaluation of the cells.
Figure 10B:
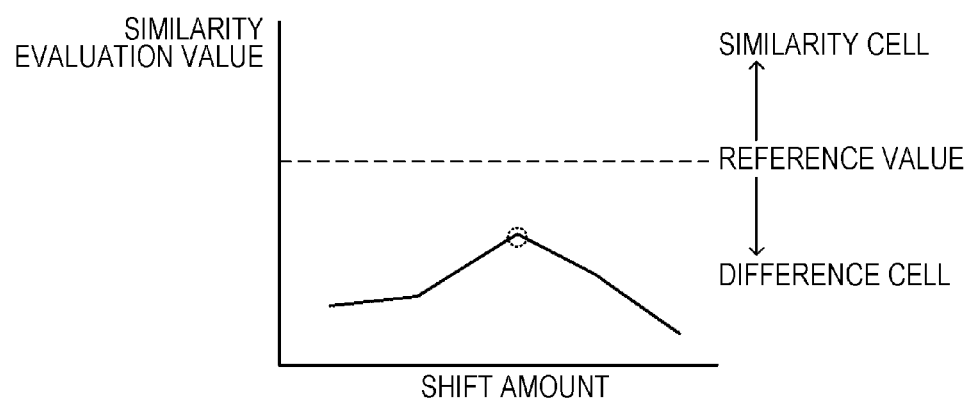

In the example illustrated in FIG. 10A, the highest similarity evaluation value is greater than the reference value when the process object cell (the photographed image cell) is shifted. Therefore, the change detection unit 170 determines that the photographed image is similar to, namely, is not different from the reference image area. On the other hand, in the example illustrated in FIG. 10B, the highest similarity evaluation value is less than the reference value when the process object cell is shifted. Therefore, the change detection unit 170 determines that the photographed image is not similar to, namely, is different from the reference image area.

Figure 11:
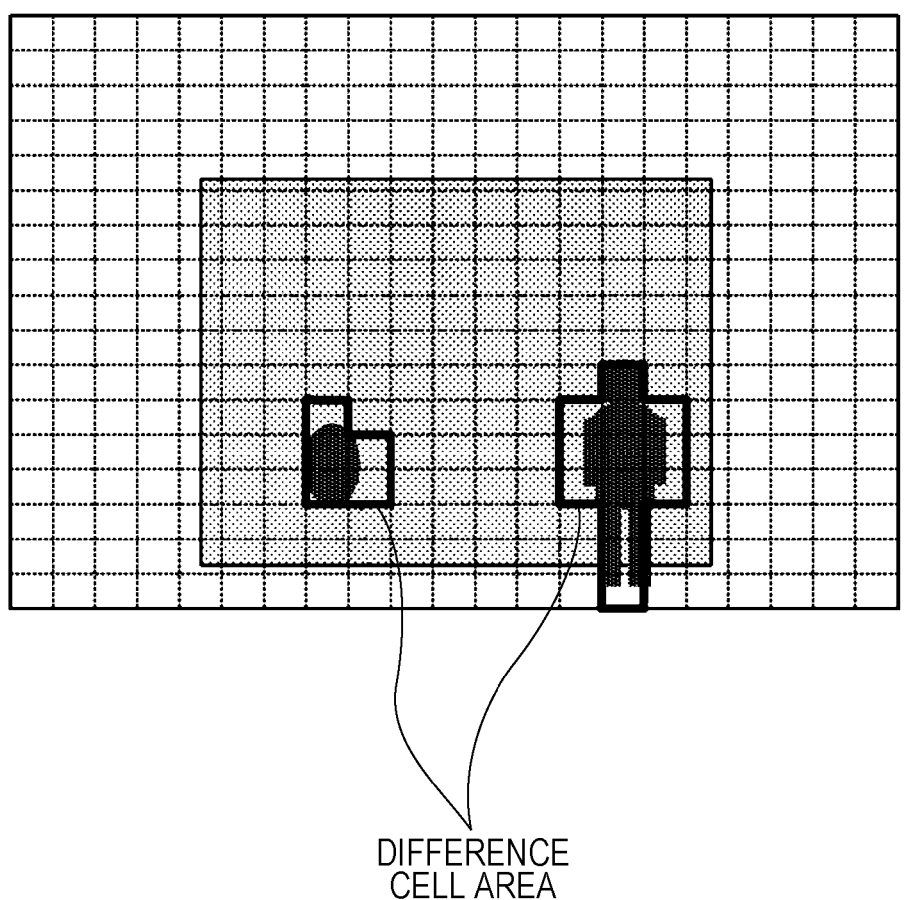
FIG. 11 is a diagram illustrating the cells determined to have a difference between the example of the photographed image depicted in FIG. 8A and the example of the reference image area depicted in FIG. 8B.

The change detection unit 170 repeats the above difference determination on a cell basis for all the cells by sequentially changing the process object cell (S109). Thereby, the change detection unit 170 extracts the area (difference cell area) made up of the cells which have been determined to be different (the difference cells) as the change area that is the area which is different from the reference image area in the photographed image. FIG. 11 illustrates the change areas made up of the difference cells in the example of the photographed image illustrated in FIG. 8A and the example of the reference image area illustrated in FIG. 8B.

If the difference cell is included in the photographed image (S110: Yes), the change detection unit 170 determines whether the difference is a difference which is caused by a slow change or a difference which is caused by a sudden change (S111). This is the process for excluding the sudden change from the object to be detected.

The change detection unit 170 can determine whether or not the difference has been caused by the sudden change can be made at the change detection unit 170 by comparing the difference cell area of the photographed image that has been acquired slightly before the time of the photographed image of the object to be processed with the difference cell area of the photographed image of the object to be processed. Thus, the change detection unit 170 temporarily saves the difference cell area of the photographed image.

Figure 12A:
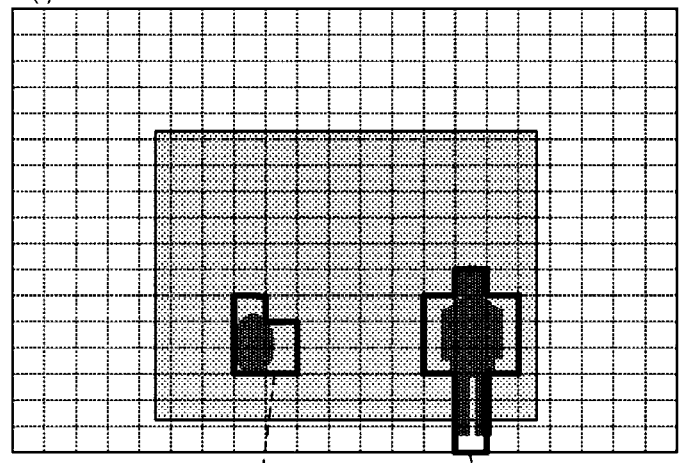
FIG. 12A and FIG. 12B are diagrams illustrating a detection of a sudden change.
Figure 12B:
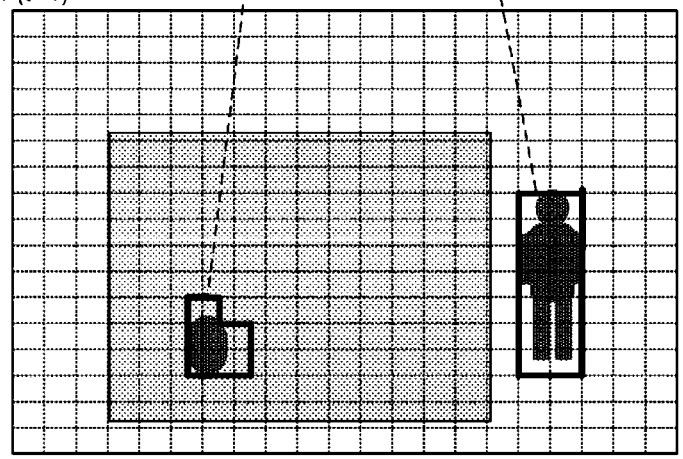

For example, it is here assumed that the difference cell area of the photographed image of the object to be processed is the photographed image at time T(t) illustrated in FIG. 12A. In this case, the change detection unit 170 compares this difference cell area with the difference cell area of the photographed image at time T(t−1) that is before the time T(t) illustrated in FIG. 12B. In this comparison, the change detection unit 170 may use the information of the difference cell area without using the photographed image itself. Then, when a difference cell group (a mass of the difference cells) surrounded by non-difference cells (the similarity cells) in the difference cell area is defined as one object, the change detection unit 170 calculates the center of gravity and the area on an object basis. In the examples illustrated in FIG. 12A and FIG. 12B, two objects exist.

The object of the photographed image at the time T(t−1) can be easily associated with the object of the image at the time T(t). Therefore, the change detection unit 170 calculates the change amount in the center of gravity and the area from the time T(t−1) to the time T(t) in each object. When the change amount is greater than or equal to a predetermined reference value, the change detection unit 170 then recognizes that the object has changed suddenly. Then, the change detection unit 170 determines that the difference cells of the object are the suddenly changed difference cells.

Figure 13:
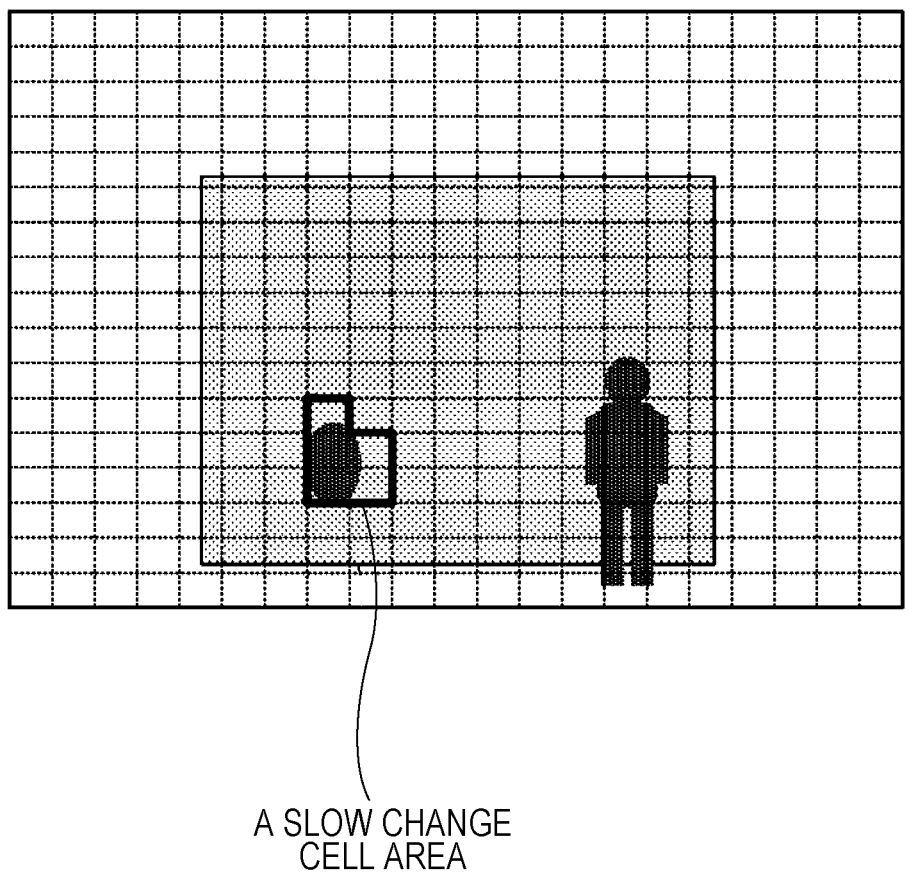
FIG. 13 is a diagram illustrating the cells determined to have a slow change between the example of the photographed image depicted in FIG. 8A and the example of the reference image area depicted in FIG. 8B.

The change detection unit 170 excludes, from the difference cells which have been determined at the process (S108), the difference cells which have been determined to have suddenly changed. That is, the change detection unit 170 acquires the area made up of the suddenly changed difference cells as the sudden change area and excludes it from the change area (the difference cell area). This allows the change detection unit 170 to extract the slow change cells (the difference cells which are not the suddenly changed difference cells) from the change area of the photographed image (S112). FIG. 13 illustrates the area (the slow change cell area) made up of the slow change cells in the example of the photographed image illustrated in FIG. 8A and the example of the reference image area illustrated in FIG. 8B.

The display control unit 180 then outputs the detected result of the slow change to the display device 120 (S113). That is, the display control unit 180 superimposes and outputs, on the photographed image, the area which includes the difference cells determined to have slowly changed as the result of the detection. Further, for the subsequent determination of the sudden change, the change detection unit 170 temporarily saves the difference cell area of the photographed image (S114).

The slow change of the monitored object included in the photographed image can be detected by repeating the above-described processes until the photographing by the consecutive image photographing device 110 is finished (S115).

The slow change detection system 100 of the present embodiment detects the slow change based on the photographed image. Therefore, the slow change can be detected easily with less labor. Moreover, overlook, error of judgment, and so on with respect to the slow change can be prevented or suppressed. Further, in the slow change detection system 100, the detected result is displayed superimposed on the photographed image, so that one is able to easily detect the slow change even if the one is not a skilled person.

It is noted that the present disclosure is not limited to the above-described embodiment, but various modifications are possible. For example, infrared consecutive images may be used in addition to the usual consecutive images or in place of the usual consecutive images. Therefore, the slow change in the temperature of the monitored object can be an object to be detected, and the detection process can be made even in a dark place. In this case, the reference images are also photographed by the infrared rays.

Further, the photographing of the monitored object area by the consecutive image photographing device 110 can be automated and remotely controlled.

The position information of the grouped monitored object area may be associated with the reference image.

The change detection unit 170 may define the connection portion of the difference cell area, as one object, and calculate the center of gravity and the area on an object basis.

Further, the slow change detection system according to the embodiments of the present disclosure may be the following first to fifth slow change detection systems. The first slow change detection system is a slow change detection system adapted to detect a slow change of a monitored object, the system including an image acquisition unit adapted to acquire a photographed image forming consecutive images; a reference image acquisition unit adapted to acquire a reference image corresponding to the photographed image; a reference image area extraction unit adapted to extract a reference image area corresponding to a photographed object of the photographed image from the reference image; a change detection unit adapted to extract an area in which the photographed image is different from the reference image area and detect, as a slow change area, an area in which a sudden change area derived from a history of the extracted area is excluded from the extracted area; and a display control unit adapted to superimpose information indicating the slow change area on the photographed image.

In the second slow change detection system in the first slow change detection system, the photographed image is associated with information of a photographed position, and the reference image acquisition unit acquires a corresponding reference image based on the information of the photographed position.

In the third slow change detection system in the first or second slow change detection system, the change detection unit divides the photographed image and the reference image area into subareas and determines whether or not there is a difference on a subarea basis by using a similarity evaluation value calculated in a predetermined procedure.

In the fourth slow change detection system in the third slow change detection system, the change detection unit calculates the similarity evaluation value even under a state where the subareas of the photographed image are shifted vertically and laterally by a predetermined amount and determines whether or not the subarea is different by using the highest evaluation value.

In the fifth slow change detection system in any one of the first to fourth slow change detection systems, the reference image area extraction unit shapes the extracted reference image area into the same shape and the same size as the photographed image.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A slow change detection system comprising at least one central processing unit operating in conjunction with a memory to:
   acquire a photographed image including a plurality of consecutive images of a monitored object;
   acquire a reference image corresponding to the photographed image of the monitored object, the reference image having been photographed prior to acquiring the photographed image including the plurality of consecutive images;
   extract, from the reference image, a reference image area that is an area corresponding to a photographed area of the photographed image;
   identify a sudden change area in the acquired photographed image based on differences in the plurality of consecutive images of the photographed image;
   acquire a change area that is an area of the photographed image which is different from the reference image area and acquire a slow change area by excluding, from the acquired change area, the sudden change area; and
   superimpose and display information indicating the slow change area on the photographed image.

2. The slow change detection system according to claim 1, wherein
the photographed image is associated with information of a photographed position, and
the reference image corresponding to the photographed image is acquired based on the information of the photographed position.

3. The slow change detection system according to claim 1, wherein the change area is acquired by:
dividing the photographed image and the reference image area into subareas, and
determining whether or not the photographed image is different from the reference image area on a subarea basis and acquiring, as the change area, an area of the photographed image including a difference subarea that is a subarea in which a degree of difference is greater than or equal to a reference value.

4. The slow change detection system according to claim 2, wherein the change area is acquired by:
dividing the photographed image and the reference image area into subareas, and
determining whether or not the photographed image is different from the reference image area on a subarea basis and acquiring, as the change area, an area of the photographed image including a difference subarea that is a subarea in which a degree of difference is greater than or equal to a reference value.

5. The slow change detection system according to claim 3, wherein the change area is acquired by:
calculating a pixel value difference between pixels positionally corresponding to the photographed image and the reference image area in the subarea and further calculating a similarity evaluation value that becomes a higher value for a smaller accumulated total of absolute values of the pixel value difference, and
determining whether or not the subarea is the difference subarea by using the similarity evaluation value.

6. The slow change detection system according to claim 4, wherein the change area is acquired by:
calculating a pixel value difference between pixels positionally corresponding to the photographed image and the reference image area in the subarea and further calculating a similarity evaluation value that becomes a higher value for a smaller accumulated total of absolute values of the pixel value difference, and
determining whether or not the subarea is the difference subarea by using the similarity evaluation value.

7. The slow change detection system according to claim 5, wherein the change area is acquired by:
shifting the subarea of the photographed image vertically and laterally by a predetermined amount, calculating the similarity evaluation value for a plurality of shifted subareas, and determining whether or not the subarea is the difference subarea by using the highest similarity evaluation value.

8. The slow change detection system according to claim 6, wherein the change area is acquired by:
shifting the subarea of the photographed image vertically and laterally by a predetermined amount, calculating the similarity evaluation value for a plurality of shifted subareas, and determining whether or not the subarea is the difference subarea by using the highest similarity evaluation value.

9. The slow change detection system according to claim 1, wherein a shape of the extracted reference image area is changed so that the extracted reference image area has a same shape and a same size as the photographed image.

10. The slow change detection system according to 2, wherein a shape of the extracted reference image area is changed so that the extracted reference image area has a same shape and a same size as the photographed image.

11. The slow change detection system according to claim 3, wherein a shape of the extracted reference image area is changed so that the extracted reference image area has a same shape and a same size as the photographed image.

12. The slow change detection system according to claim 4, wherein a shape of the extracted reference image area is changed so that the extracted reference image area has a same shape and a same size as the photographed image.

13. The slow change detection system according to claim 5, wherein a shape of the extracted reference image area is changed so that the extracted reference image area has a same shape and a same size as the photographed image.

14. The slow change detection system according to claim 6, wherein a shape of the extracted reference image area is changed so that the extracted reference image area has a same shape and a same size as the photographed image.

15. The slow change detection system according to claim 7, wherein a shape of the extracted reference image area is changed so that the extracted reference image area has a same shape and a same size as the photographed image.

16. The slow change detection system according to claim 8, wherein a shape of the extracted reference image area is changed so that the extracted reference image area has a same shape and a same size as the photographed image.

17. The slow change detection system according to claim 3, wherein the change area is acquired by:
defining a difference subarea group surrounded by subareas that are not the difference subareas, as one object; and
calculating a change amount of a center of gravity and an area in the object and, when the change amount is greater than or equal to a predetermined reference value, acquiring an area including difference subareas forming the object as the sudden change area.

18. The slow change detection system according to claim 1, wherein the sudden change area is determined by comparing the change area with an image of the area acquired before the acquisition of the change area.

19. The slow change detection system according to claim 17, wherein the change amount of the center of gravity and the area in the object is calculated by comparing a photographed image of the object at time T(t) with a photographed image of the object at time T(t−1) that is before the time T(t).

20. A slow change detection system comprising at least one central processing unit (CPU) configured to:
acquire, from a camera, a plurality of consecutive images of a monitored object;
acquire a reference image of the monitored object, the reference image having been obtained by photographing the monitored object in a reference state prior to acquiring the consecutive images;
identify a sudden change area of the monitored object based on differences in the plurality of consecutive images;
determine a change area between the reference image and the consecutive images; and
detect a slow change area by excluding the sudden change area from the change area.

* * * * *